(12) United States Patent
Hwang

(10) Patent No.: US 12,570,390 B2
(45) Date of Patent: Mar. 10, 2026

(54) AIRCRAFT WITH DETACHABLE WINGS AND METHOD OF DETACHING ITS WINGS

(71) Applicants: Hyundai Motor Company, Seoul (KR); Kia Corporation, Seoul (KR)

(72) Inventor: Eugene Hwang, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/627,703

(22) Filed: Apr. 5, 2024

(65) Prior Publication Data

US 2025/0171132 A1 May 29, 2025

(30) Foreign Application Priority Data

Nov. 23, 2023 (KR) ......................... 10-2023-0164609

(51) Int. Cl.
*B64C 3/38* (2006.01)
*B64D 45/00* (2006.01)

(52) U.S. Cl.
CPC ................ *B64C 3/38* (2013.01); *B64D 45/00* (2013.01)

(58) Field of Classification Search
CPC .... B64C 1/26; B64C 1/32; B64C 3/38; B64D 25/00; B64D 45/00; F42B 3/006
See application file for complete search history.

(56) References Cited

U.S. PATENT DOCUMENTS

| | | | | |
|---|---|---|---|---|
| 2,992,794 | A * | 7/1961 | Boyd | F42B 15/36 244/3.25 |
| 3,311,324 | A * | 3/1967 | Holt | B64D 47/00 273/362 |
| 3,409,254 | A * | 11/1968 | Nastase | B64D 17/80 244/138 R |
| 5,009,374 | A * | 4/1991 | Manfredi | F42B 3/006 102/378 |
| 5,924,649 | A * | 7/1999 | Piening | B64C 3/20 416/241 A |
| 8,256,716 | B2 * | 9/2012 | Dietrich | B64U 10/25 244/131 |
| 11,447,265 | B1 * | 9/2022 | Wiegman | B64D 45/00 |
| 11,643,201 | B2 * | 5/2023 | Vanni | B64C 27/26 244/7 R |
| 2008/0142635 | A1 | 6/2008 | Manfredi et al. | |
| 2010/0004803 | A1 | 1/2010 | Manfredi et al. | |
| 2012/0112004 | A1 | 5/2012 | Tanaka et al. | |
| 2022/0024572 | A1 | 1/2022 | Vanni et al. | |

FOREIGN PATENT DOCUMENTS

| | | |
|---|---|---|
| CN | 113443145 A | 9/2021 |
| DE | 19717989 A1 | 10/1998 |
| JP | 2011020642 A | 2/2011 |
| KR | 100627446 B1 | 9/2006 |

(Continued)

*Primary Examiner* — Michael H Wang
*Assistant Examiner* — Michael B. Kreiner
(74) *Attorney, Agent, or Firm* — SLATER MATSIL, LLP

(57) ABSTRACT

An embodiment aircraft includes a fuselage, a wing coupled to the fuselage, a fixing portion connecting a portion of the wing to the fuselage, and a controller disposed in the fuselage, wherein the controller is configured to transmit a severing signal to cause a portion of the fixing portion to be severed.

13 Claims, 3 Drawing Sheets

(56)        References Cited

FOREIGN PATENT DOCUMENTS

| | | | |
|---|---|---|---|
| KR | 101341372 | B1 | 12/2013 |
| KR | 20160148383 | A | 12/2016 |
| KR | 102482749 | B1 | 12/2022 |
| WO | 0174659 | A1 | 10/2001 |
| WO | 2009039787 | A1 | 4/2009 |
| WO | 2018012768 | A1 | 1/2018 |

* cited by examiner

180

AIRCRAFT WITH DETACHABLE WINGS AND METHOD OF DETACHING ITS WINGS

CROSS-REFERENCE TO RELATED APPLICATIONS

This application claims the benefit of Korean Patent Application No. 10-2023-0164609, filed on Nov. 23, 2023, which application is hereby incorporated herein by reference in its entirety.

TECHNICAL FIELD

The present disclosure relates to an aircraft with detachable wings and a method of detaching the wings of the aircraft.

BACKGROUND

Recently, an urban air mobility (UAM) for future transportation and traffic systems has been under development. A UAM may be an aircraft capable of vertical takeoff and landing, and wings thereof are generally located on the top of a fuselage in consideration of the convenience of passengers getting on and off the aircraft.

As the wings are located on the top of the fuselage, the weight of the upper portion of the fuselage may increase, and in the event of an aircraft crash or emergency landing, a load on the wings may cause severe deformation or damage to the fuselage, which may threaten safety for passengers on board the aircraft.

In the related art technology, an airplane with wings located on the sides of the fuselage is provided with a separate cabin and a parachute is installed in the separate cabin to rescue passengers when the airplane suddenly descends due to a malfunction or fire.

However, when the wings are located in an upper portion of the fuselage, it may be difficult to install and release the parachute, and an increase in weight of the aircraft due to the installation of the parachute may be disadvantageous for the operational performance of the aircraft.

Therefore, for aircraft, such as a UAM, in which the wings are located on the top of the fuselage, technology is required to reduce the impact acting on the fuselage during an emergency landing and ensure passenger safety.

SUMMARY

An embodiment of the present disclosure provides an aircraft in which wings are connected to a fuselage using a fixing portion that may be severable, such as with explosive bolts, and the fixing portion is severed to allow the wings to be separated from the fuselage based on detection that the fuselage strongly impacts the ground during an emergency landing.

According to an embodiment of the present disclosure, an aircraft includes a fuselage, a wing coupled to the fuselage, a fixing portion fixing a portion of the wing to the fuselage, and a controller provided in the fuselage, wherein at least a portion of the fixing portion is severed by a severing signal transmitted from the controller.

The aircraft may further include a sensor portion provided in at least a portion of the fuselage and sensing status information of the fuselage, wherein the controller may generate the severing signal based on the status information and may transmit the generated severing signal to the fixing portion.

The sensor portion may include an impact sensor detecting an impact applied to the fuselage, and the controller may transmit the severing signal to the fixing portion to sever the fixing portion when the detected impact is equal to or greater than a reference value.

The sensor portion may include at least one of an impact sensor, an altitude sensor, a speed sensor, an acceleration sensor, a position sensor, a proximity sensor, and a strain sensor.

When the sensor portion includes the strain sensor, the controller may generate the severing signal based on a strain rate of the fuselage measured by the strain sensor.

When the sensor portion includes the altitude sensor and the speed sensor, the controller may generate the severing signal based on a position between the fuselage and the ground and a collision prediction time.

When the fixing portion is cut, a connection portion of the fuselage and the wing connected by the fixing portion may be separated.

The aircraft may further include a hinge portion rotatably connecting a portion of the wing to the fuselage, wherein a first connection portion of the wing and the fuselage connected by the hinge portion is located to be lower than a second connection portion of the wing and the fuselage connected by the fixing portion.

When the second connection portion is separated by cutting the fixing portion, the wing may rotate around the hinge portion in a direction toward the fuselage.

When the fixing portion is severed due to a collision between the fuselage and the ground, the second connection portion may be separated and at least a portion of the wing may come into contact with the ground.

The controller may sever the fixing portion so that the wing contacts the ground simultaneously with, or immediately after, the collision between the fuselage and the ground, based on the impact detection of the sensor portion.

The aircraft may further include a cable electrically connecting the controller, the sensor portion, and the fixing portion.

The fixing portion may include an explosive bolt, and the severing signal may be an ignition signal for igniting the explosive bolt.

According to another embodiment of the present disclosure, a method of detaching a wing of an aircraft includes detecting a collision of a fuselage and measuring an amount of impact through a sensor portion provided in the fuselage, determining whether the measured amount of impact is greater than or equal to a reference value, transmitting a severing signal to a fixing portion fixing the wing to the fuselage when the amount of impact is equal to or greater than the reference value, cutting the fixing portion according to the severing signal, and separating at least a portion of the wing from the fuselage by cutting the fixing portion.

When the fixing portion is severed due to a collision between the fuselage and the ground, the fixing portion may be severed so that the wing contacts the ground simultaneously with, or immediately after, the collision between the fuselage and the ground, based on the collision detection of the sensor portion.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Figure 1:
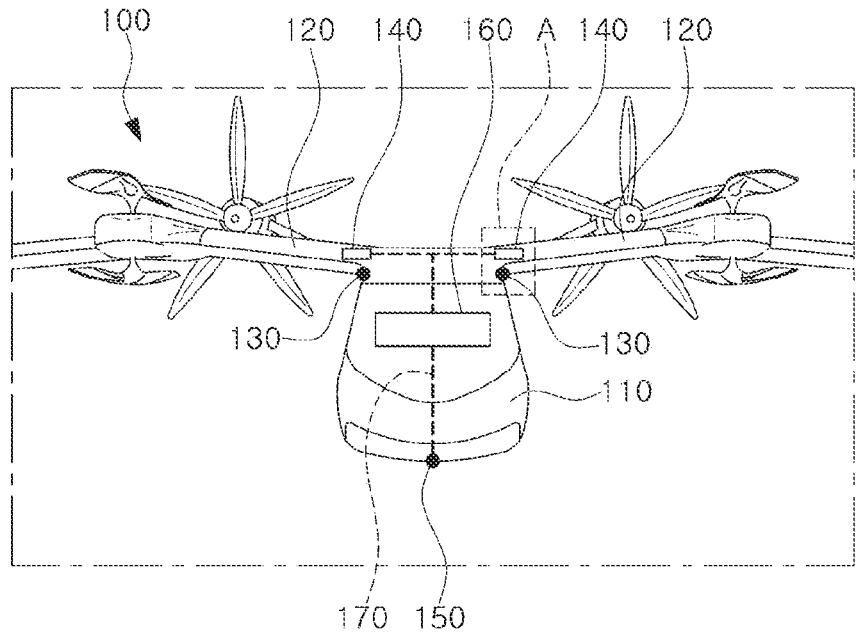
FIG. 1 schematically illustrates an aircraft according to an embodiment of the present disclosure.

While the present disclosure may be modified in various ways and take on various alternative forms, specific embodiments thereof are illustrated in the drawings and described in detail below. However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," and the like may be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terminology used herein to describe embodiments of the present disclosure is not intended to limit the scope of the present disclosure. The articles "a" and "an" are singular in that they have a single referent, however the use of the singular form in the present document should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

If it is not contrarily defined, all terms used herein including technological or scientific terms have the same meanings as those generally understood by a person with ordinary skill in the art. Terms defined in a generally used dictionary shall be construed such that they have meanings matching those in the context of a related art, and they shall not be construed as having ideal or excessively formal meanings unless they are clearly defined in the present application.

In this specification, an aircraft may refer to a mobility vehicle that may move by flying in the sky. That is, in addition to referring to helicopters, drones, tilt rotors, fixed-wing airplanes, and the like, an aircraft may also include vehicles that move on the ground using wheels, and the like, and may fly with the wheels, and the like, separated from the ground. In addition, aircraft may include manned aircraft and unmanned aircraft. Manned aircraft may include aircraft that may operate autonomously in addition to aircraft controlled by a pilot.

Hereinafter, embodiments of the present disclosure will be described with reference to the drawings.

Figure 2:
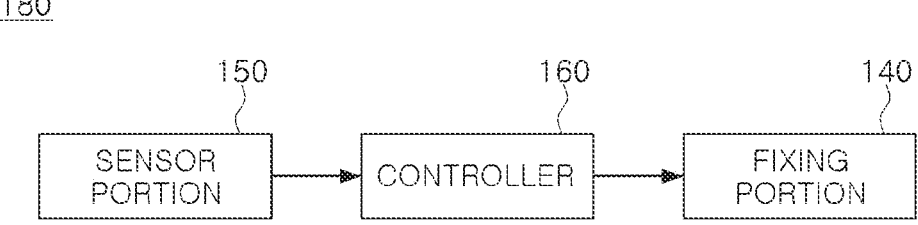
FIG. 2 illustrates a block diagram of a wing separation system of an aircraft according to an embodiment of the present disclosure.

FIG. 1 schematically illustrates an aircraft 100 according to an embodiment of the present disclosure. FIG. 2 illustrates a block diagram of a wing separation system 180 of the aircraft 100 according to an embodiment of the present disclosure.

Referring to FIGS. 1 and 2, the aircraft 100 according to an embodiment may include a fuselage (or an airframe) 110 in which passengers may ride and/or cargo may be loaded and wings 120 coupled to an upper portion of the fuselage 110 and having a rotor generating lift force. For example, the aircraft 100 may be provided as a structure in which the wings 120 are located at the top of the fuselage 110.

The aircraft 100 is an air mobility capable of vertical take-off and landing (VTOL) and may include an urban air mobility (UAM) and an advanced air mobility (AAM). However, the type of aircraft 200 is not particularly limited.

The aircraft 100 may further include a hinge portion 130, a fixing portion 140, a sensor portion 150, and a controller 160. Here, the fixing portion 140, the sensor portion 150, and the controller 160 may constitute a wing separation system 180 of the aircraft 100. The wing separation system 180 of the aircraft 100 may be configured to reduce an impact applied to the fuselage 110 by separating a connection portion of the fuselage 110 and the wing 120 connected through the fixing portion 140, based on external information (e.g., impact, falling speed, altitude or distance from the ground, and the like) detected by the sensor portion 150 when the aircraft 100 lands.

Meanwhile, although not illustrated in FIG. 1, the aircraft 100 may further include a landing gear member (not illustrated) provided in a lower portion of the fuselage 110.

The hinge portion 130 may rotatably connect the fuselage 110 and the wing 120. For example, a portion of the wing 120 may be rotatably connected to the fuselage 110 through the hinge portion 130. The hinge portion 130 may be located to be lower than the fixing portion 140. For example, the hinge portion 130 may connect a lower end portion of the wing 120 to the fuselage 110, and when the fixing portion 140 is separated, the wing 120 may be folded downwardly, while rotating in a direction toward the fuselage based on the hinge portion 130. A first connection portion of the fuselage 110 and the wing 120 connected by the hinge portion 130 may be located to be closer to the fuselage 110 than a second connection portion of the fuselage 110 and the wing 120 connected by the fixing portion 140.

The fixing portion 140 may connect the fuselage 110 and the wing 120, and at least a portion of the fixing portion 140 may be severed based on a severing signal. The fixing portion 140 may connect the fuselage 110 and the wing 120 so that at least a portion of the wing 120 is fixed to and/or restrained by the fuselage 110.

As the fixing portion 140 is cut, the second connection portion of the wing 120 and the fuselage 110 connected by the fixing portion 140 may be separated. The severing signal for severing the fixing portion 140 may be generated by and transmitted from the controller 160. For example, the fixing portion 140 and the controller 160 may be electrically connected through a cable 170, and the severing signal generated by the controller 160 may be transmitted to the fixing portion 140 through the cable 170. The severing signal may be an electrical signal.

The structure in which the fuselage 110 and the wing 120 are connected through the hinge portion 130 and the fixing portion 140 and the operation of separating the fuselage 110 and the wings 120 by severing the fixing portion 140 will be described in more detail with reference to FIG. 3 hereinafter.

The sensor portion 150 may detect an impact applied to the aircraft 100 when the aircraft 100 collides with the ground. The sensor portion 150 may include an impact sensor. The sensor portion 150 may be provided inside and/or outside the fuselage 110. For example, the sensor portion 150 may be provided in the fuselage 110 to detect an impact applied to the lower portion of the fuselage 110 when colliding with the ground during an emergency landing.

The sensor portion 150 may transmit the detected amount of impact to the controller 160. For example, the sensor portion 150 and the controller 160 may be electrically connected through the cable 170, and the information on the amount of impact detected and/or measured by the sensor portion 150 may be transmitted to the controller 160.

The sensor portion 150 may include another sensor instead of the impact sensor or may further include one or more sensors in addition to the impact sensor. For example, the sensor portion 150 may include at least one of an impact sensor, an altitude sensor, a speed sensor, an acceleration sensor, a position sensor, a proximity sensor, and a strain sensor (or a strain gauge), and may further include various types of sensors in addition to the sensors described above.

The sensor portion 150 illustrated in FIG. 1 may be referred to as an impact sensor provided to be adjacent to a lower surface of the fuselage 110. However, the position of the sensor included in the sensor portion 150 is not limited to FIG. 1, and the sensor may be installed in an appropriate position depending on the type of sensor.

The sensor portion 150 may transmit pieces of information measured by at least some of the plurality of sensors to the controller 160. The pieces of information measured/detected by a plurality of sensors of the sensor portion 150 may be used as a reference for determining whether to sever the fixing portion 140.

For example, if the sensor portion 150 includes an altitude sensor and a speed sensor, it is possible to determine whether to sever the fixing portion 140 by predicting the positions of the aircraft 100 and the ground and a collision. In addition, when the sensor portion 150 includes a strain sensor, it is possible to determine whether to sever the fixing portion 140 by measuring a strain rate of the fuselage 110. In addition, when the sensor portion 150 includes a proximity sensor, it is possible to determine whether to sever the fixing portion 140 by detecting whether the landing gear provided in the lower portion of the fuselage 110 invades the fuselage 110. However, the above description is an example, and the reference for determining whether to sever the fixing portion 140 may vary depending on the types of sensors.

The controller 160 may determine that the aircraft 100 is in an emergency landing or has made an emergency landing based on sensing information measured by the sensor portion 150, and the controller 160 may transmit a severing signal to the fixing portion 140 to separate the wings 120 from the fuselage 110. For example, the controller 160 may determine whether the aircraft 100 has collided with the ground or is on the verge of collision based on the sensing information, determine separation of the wings 120 and the fuselage 110, and transmit a severing signal to the fixing portion 140. The controller 160 may be provided inside the fuselage 110.

The controller 160 may be connected to the sensor portion 150 and the fixing portion 140 through the cable 170. The controller 160 may receive sensing information from the sensor portion 150 through the cable 170 and transmit a severing signal to the fixing portion 140 through the cable 170.

Figure 3:
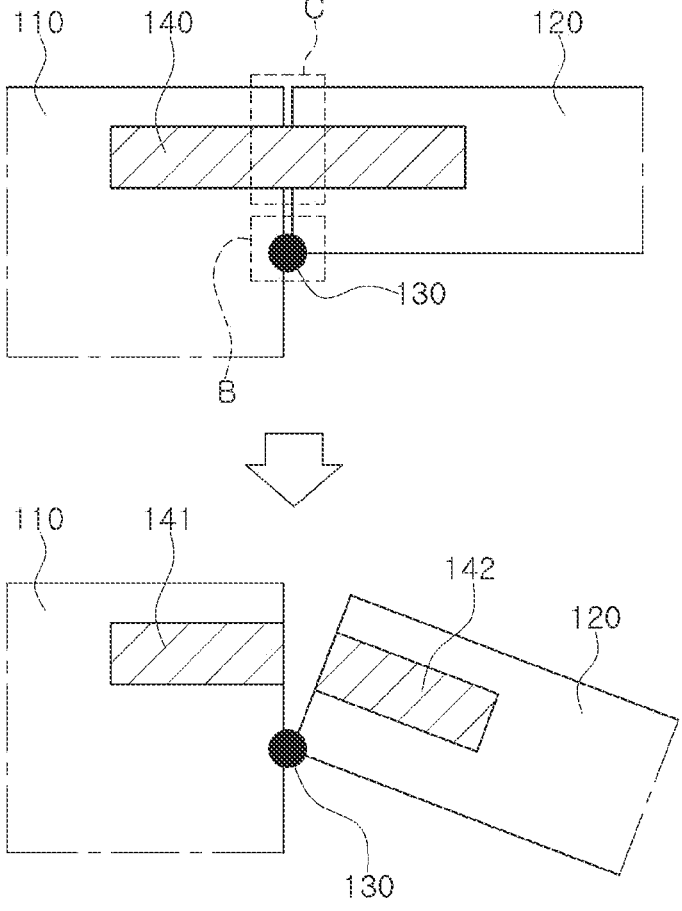
FIG. 3 schematically illustrates an operation of separating wings from a fuselage in an aircraft according to an embodiment of the present disclosure.

FIG. 3 schematically illustrates an operation in which the fuselage 110 and the wings 120 are separated in the aircraft 100 according to an embodiment of the present disclosure.

FIG. 3 is a schematic enlarged view of portion A of the aircraft 100 illustrated in FIG. 1, illustrating the operation of separating the fuselage and the wings as the fixing portion 140 is severed/broken. Hereinafter, in describing FIG. 3, FIGS. 1 and 2 will be referred to together.

Referring to FIG. 3, the wing 120 of the aircraft 100 may be connected and coupled to the fuselage 110 through the hinge portion 130 and the fixing portion 140.

The wing 120 may be rotatably connected to the fuselage 110 through the hinge portion 130 and may be fixed/restrained to the fuselage 110 through the fixing portion 140. For example, a lower end portion of the wing 120 may be rotatably connected to the fuselage 110 through the hinge portion 130, and an upper end portion and/or center of the wing 120 may be fixedly coupled to the fuselage 110 through the fixing portion 140. The fixing portion 140 may provide a coupling force sufficient for stably fixing and restraining the wing 120 and the fuselage 110.

A first connection portion B of the wing 120 and the fuselage 110 may be connected by the hinge portion 130 and may be connected to be rotatable with respect to each of the wing 120 and the fuselage 110. A second connection portion C of the wing 120 and the fuselage 110 may be connected by the fixing portion 140 and may be connected to fix and restrain the wing 120 and the fuselage 110 to each other.

The first connection portion B may be located below the second connection portion C. For example, the first connection portion B may be a lower connection portion, and the second connection portion C may be an upper connection portion. Since the first connection portion B is located below the second connection portion C, the wing 120 may be folded downwardly when the wing 120 and the fuselage 110 are separated. For example, when the fixing portion 140 is cut/broken, the upper end portion and the center of the wing 120 may be separated from the fuselage 110, and the lower end portion of the wing 120 may be rotated in a state of being connected to the fuselage 110 through the hinge portion 130.

As a portion of the fixing portion 140 may be coupled to the fuselage 110 and the other portion may be coupled to the wing 120, the wing 120 may be restrained or fixed to the fuselage 110. A portion of the fixing portion 140 may be cut/broken based on a severing signal transmitted from the controller 160.

The fixing portion 140 may be an explosive bolt (or pyro bolt), and the severing signal, as an electrical signal, may be an ignition signal for igniting the explosive bolt. For example, the fixing portion 140 implemented as an explosive bolt may be provided in the shape of a bolt and may be provided with gunpowder therein. The gunpowder provided in the explosive bolt may explode by ignition, but when the gunpowder explodes, impact transmission to the outside is minimally blocked, and the amount of gunpowder is set so that only the explosive bolt may be severed and/or broken. The explosive bolt is a well-known technology in the art, and thus, a detailed description thereof will be omitted.

In FIG. 3, when the fixing portion 140 is an explosive bolt and an ignition signal is applied to the explosive bolt 140 from the controller 160, the explosive bolt 140 is ignited, the gunpowder inside explodes, and the explosive bolt 140 is cut/broken due to the explosion. For example, the explosive bolt 140 may be severed into a first portion 141 coupled to the fuselage 110 and a second portion 142 coupled to the wing 120. As the explosive bolt is cut/broken, the connection portion C (e.g., the second connection portion or the upper end connection portion) of the wing 120 and the fuselage 110, which were fixed or restrained through the explosive bolt, is separated.

Meanwhile, the fixing portion 140 is not limited to being implemented as an explosive bolt and may be implemented using various equipment or devices that may connect the fuselage 110 and the wings 120 by fixing or restraining them and may be severed or broken according to an external signal to separate the fuselage 110 and the wing 120. For example, the fixing portion 140 may be implemented as a device automatically severed at a certain tension or higher.

When the fixing portion 140 is cut, the connection portion of the wing 120 and the fuselage 110 connected by the fixing portion 140 may be separated and the fixing force/restraining force of the wing 120 and the fuselage 110 by the fixing portion 140 may be removed, and thus, the wing 120 may rotate with respect to the fuselage 110 around the hinge portion 130. For example, the wing 120 may be folded downwardly by rotating around the hinge portion 130.

According to various embodiments, the aircraft 100 may be configured without the hinge portion 130. For example, the wing 120 and the fuselage 110 may be restrained or fixed through the fixing portion 140 without the hinge portion 130, and if the fixing portion 140 is cut/broken, the wing 120 may be configured to be completely separated from the fuselage 110.

Figure 4:
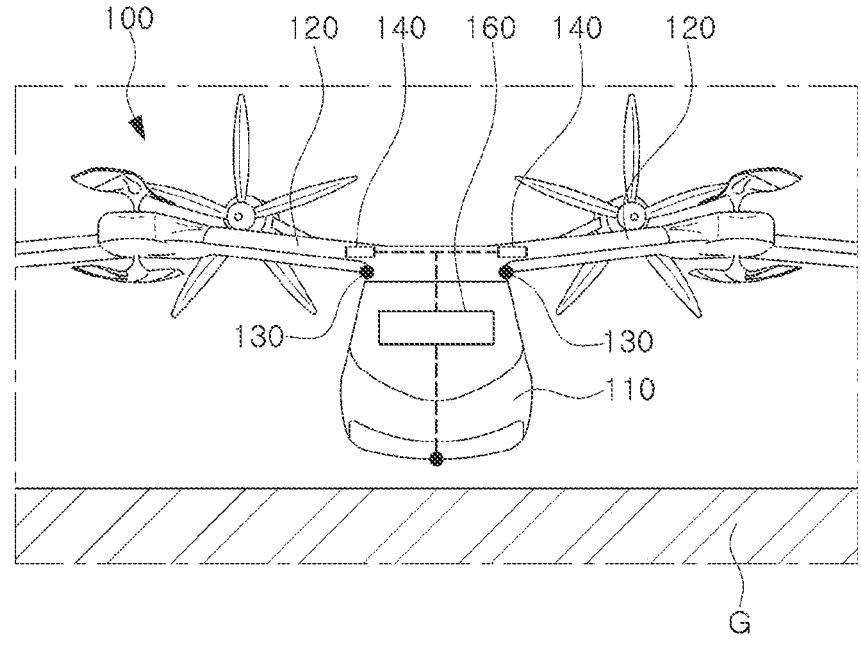
FIGS. 4 and 5 illustrate an operation in which wings are separated and contact the ground in an emergency landing situation of an aircraft according to an embodiment of the present disclosure.
Figure 5:
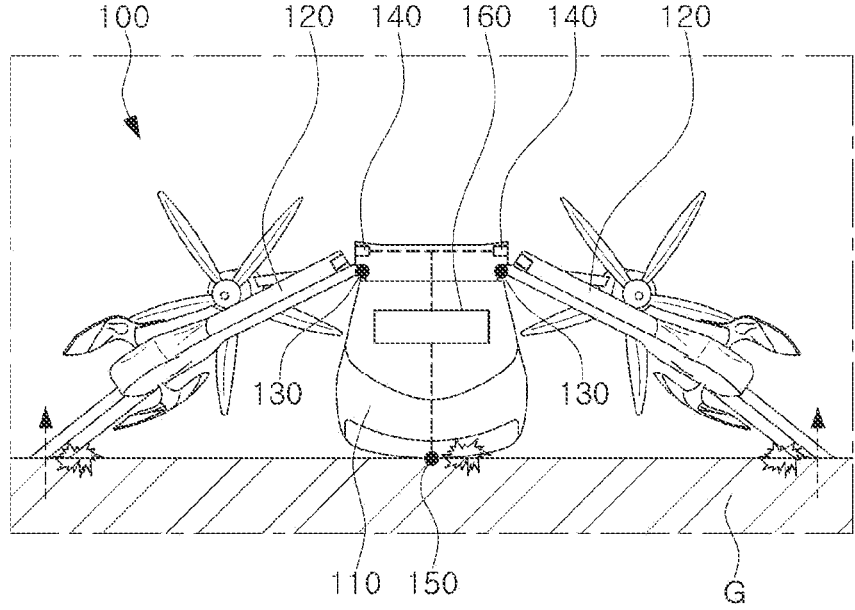

FIGS. 4 and 5 illustrate an operation of the wing separation system 180 to separate the wing 120 in an emergency landing situation of the aircraft 100 according to an embodiment of the present disclosure.

The operations illustrated in FIGS. 4 and 5 are performed by the wing separation system 180 of the aircraft 100 described above with reference to FIGS. 1 to 3. Hereinafter, in describing FIGS. 4 and 5, redundant descriptions given above with reference to FIGS. 1 to 3 will be omitted.

FIG. 4 illustrates a situation before the aircraft 100 collides with the ground G during an emergency landing, and FIG. 5 illustrates a situation in which the aircraft 100 collides with the ground G and the wings 120 are separated and contact the ground G.

Referring to FIGS. 4 and 5, the wing separation system 180 may operate when the aircraft 100 lands in an emergency situation rather than in a normal situation. For example, an emergency landing is when the aircraft 100 fails to land according to normal operation/control and lands in an emergency situation. In the case of an emergency landing, the amount of impact applied to the aircraft 100 may be relatively large compared to a normal landing.

The wing separation system 180 may determine an emergency landing situation by measuring the size of the impact and comparing the same with a reference value. If the amount of impact is greater than the reference value, the wing separation system 180 may operate to sever the fixing portion 140 and separate the wings 120, thereby bringing the wings 120 into contact with the ground G. When the wing 120 is separated and contacts the ground G, the impact transmitted to the fuselage 110 due to the collision between the wing 120 and the ground G may be absorbed and/or buffered, and a load of the wing 120 acting on the upper portion of the fuselage 110 may be reduced. Through this, deformation of the fuselage 110 may be minimized and passenger safety may be improved when passengers are within the fuselage 110.

Specifically, as the fuselage 110 collides with the ground G in an emergency landing situation, the sensor portion 150 detects and measures the amount of impact greater than a reference value. The controller 160 applies a severing signal to the fixing portion 140 because the amount of impact measured by the sensor portion 150 is greater than the reference value. The fixing portion 140 is cut/broken by a severing signal transmitted from the controller 160, and as the fixing portion 140 is cut/broken, the upper end connection portion C of the wing 120 and the fuselage 110 is separated. When the upper end connection portion C of the wing 120 and the fuselage 110 is separated, the wing 120 rotates with respect to the fuselage 110 around the hinge portion 130, and accordingly, the wing 120 is folded downwardly, while contacting and colliding with the ground.

The controller 160 accurately determines a point in time when the fuselage 110 collides with the ground G using the impact detection from the sensor portion 150 and severs the fixing portion 140 so that the wing 120 may contact the ground G simultaneously when the fuselage 110 collides with the ground G or immediately after the collision.

FIGS. 4 and 5 illustrate that a bottom surface of the fuselage 110 directly collides with the ground G, but this is an example and the landing gear may collide with the ground G first in an emergency landing situation. For example, the sensor portion 150 may measure the amount of impact when the landing gear collides with the ground G using an impact sensor, and it may additionally or alternatively measure the degree of invasion of the fuselage 110 by the landing gear due to a strong collision using a proximity sensor. The controller 160 may determine that it is an emergency landing situation based on at least some of the pieces of sensing information from the sensor portion 150 as described above and apply a severing signal to the fixing portion 140.

Hereinafter, an operating method of the wing separation system 180 of the aircraft 100 when the sensor portion 150 is provided as an impact sensor will be described by way of example.

The operating method of the wing separation system 180 may include an operation of detecting, by the sensor portion 150, a collision of the fuselage 110 and measuring the amount of impact, an operation of determining, by the controller 160, whether the amount of impact is equal to or greater than a reference value, an operation of transmitting, by the controller 160, a severing signal to the fixing portion 140 when the amount of impact is equal to or greater than the reference value, an operation of severing the fixing portion 140 by the severing signal, and an operation of separating the upper end connection portion C of the wing 120 and the fuselage 110 according to the severing of the fixing portion 140.

However, as described above, the sensor portion 150 may alternatively or additionally include other types of sensors in addition to the impact sensor, and in the case of including other types of sensors, whether to sever the fixing portion 140 may be determined using the pieces of information sensed by each sensor additionally, thereby improving the reliability.

According to an embodiment of the present disclosure, a load of the fuselage may be reduced by severing the fixing portion and separating the wing from the fuselage during an emergency landing, deformation of the fuselage may be minimized by absorbing impact when the separated wing contacts the ground, and the safety of passengers may be improved.

What is claimed is:

1. An aircraft comprising:
a fuselage;
a wing coupled to the fuselage;
a fixing portion connecting a portion of the wing to the fuselage;
a controller disposed in the fuselage, wherein the controller is configured to transmit a severing signal to cause a portion of the fixing portion to be severed; and
a sensor portion disposed in a portion of the fuselage, wherein:
the sensor portion comprises an impact sensor configured to detect an impact applied to the fuselage, and
the controller is further configured to transmit the severing signal to the fixing portion to sever the portion of the fixing portion in response to the detected impact being equal to or greater than a reference value.

2. The aircraft of claim 1, wherein:
the sensor portion is configured to sense status information of the fuselage, and
the controller is further configured to generate the severing signal based on the status information and to transmit the generated severing signal to the fixing portion.

3. The aircraft of claim 2, wherein the sensor portion further comprises:
an altitude sensor;
a speed sensor;
an acceleration sensor;
a position sensor;
a proximity sensor; or
a strain sensor.

4. The aircraft of claim 3, wherein, in a case in which the sensor portion comprises the strain sensor, the controller is further configured to generate the severing signal based on a strain rate of the fuselage measured by the strain sensor.

5. The aircraft of claim 3, wherein, in a case in which the sensor portion comprises the altitude sensor and the speed sensor, the controller is further configured to generate the severing signal based on a distance between the fuselage and a ground surface and a collision prediction time.

6. The aircraft of claim 1, wherein, in response to the portion of the fixing portion being severed, a connection portion of the fuselage and the wing connected by the fixing portion is separated.

7. The aircraft of claim 1, wherein:
the fixing portion comprises an explosive bolt; and
the severing signal comprises an ignition signal for igniting the explosive bolt.

8. An aircraft comprising:
a fuselage;
a wing;
a hinge portion rotatably connecting a first connection portion of the wing to the fuselage;
a fixing portion connecting a second connection portion of the wing to the fuselage, wherein the first connection portion of the wing and the fuselage connected by the hinge portion is lower than the second connection portion of the wing and the fuselage connected by the fixing portion;
a sensor portion disposed in a portion of the fuselage, wherein the sensor portion is configured to sense status information of the fuselage, and wherein the sensor portion comprises an impact sensor configured to detect an impact applied to the fuselage; and
a controller disposed in the fuselage, wherein the controller is configured to generate a severing signal based on the status information sensed by the sensor portion and to transmit the severing signal to the fixing portion to cause a portion of the fixing portion to be severed in response to the detected impact being equal to or greater than a reference value.

9. The aircraft of claim 8, wherein, in response to the second connection portion being separated by severing of the fixing portion, the wing is configured to rotate around the hinge portion in a direction toward the fuselage.

10. The aircraft of claim 9, wherein, in response to the fixing portion being severed due to a collision between the fuselage and a ground surface, the second connection portion is separated and a portion of the wing comes into contact with the ground surface.

11. The aircraft of claim 10, wherein the controller is configured to sever the fixing portion so that the wing contacts the ground surface simultaneously with, or immediately after, the collision between the fuselage and the ground surface, based on the detected impact.

12. The aircraft of claim 8, further comprising a cable electrically connecting the controller, the sensor portion, and the fixing portion.

13. The aircraft of claim 8, wherein:
the fixing portion comprises an explosive bolt; and
the severing signal comprises an ignition signal for igniting the explosive bolt.

* * * * *